US009218358B2

(12) United States Patent  (10) Patent No.: US 9,218,358 B2
Shaban Hussein  (45) Date of Patent: Dec. 22, 2015

(54) IDENTIFYING FILES STORED ON CLIENT DEVICES AS WEB-BASED SEARCH RESULTS

(75) Inventor: Kareem Ahmed Shaban Hussein, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 28 days.

(21) Appl. No.: 13/341,440

(22) Filed: Dec. 30, 2011

(65) Prior Publication Data

US 2013/0173634 A1  Jul. 4, 2013

(51) Int. Cl.
G06F 17/30  (2006.01)
(52) U.S. Cl.
CPC .... G06F 17/30194 (2013.01); G06F 17/30165 (2013.01)
(58) Field of Classification Search
USPC ......... 707/706, 722, 736, 758, 769, 783, 709, 707/770
See application file for complete search history.

(56) References Cited

U.S. PATENT DOCUMENTS

| | | | |
|---|---|---|---|
| 6,341,314 B1 | 1/2002 | Doganata et al. | |
| 7,801,971 B1* | 9/2010 | Amidon et al. | 709/217 |
| 7,930,301 B2 | 4/2011 | Marcjan et al. | |
| 8,140,506 B2* | 3/2012 | Pennington | 707/706 |
| 8,346,864 B1* | 1/2013 | Amidon et al. | 709/204 |
| 2007/0203887 A1* | 8/2007 | Dynin | 707/3 |
| 2009/0259720 A1* | 10/2009 | Heins et al. | 709/205 |
| 2010/0106752 A1* | 4/2010 | Eckardt et al. | 707/805 |
| 2010/0228617 A1* | 9/2010 | Ransom et al. | 705/14.25 |
| 2010/0257239 A1* | 10/2010 | Roberts | 709/204 |
| 2011/0162038 A1* | 6/2011 | Chunilal | 726/1 |
| 2011/0225293 A1* | 9/2011 | Rathod | 709/224 |
| 2012/0016858 A1* | 1/2012 | Rathod | 707/706 |
| 2012/0117271 A1* | 5/2012 | Kennedy et al. | 709/248 |
| 2013/0031171 A1* | 1/2013 | Serena | 709/204 |

OTHER PUBLICATIONS

Zerr, et al., "deskWeb2.0: Combining Desktop and Social Search", In Proceedings of SIGIR, Workshop on Desktop Search, Jul. 23, 2010, 4 pages.
Decker, et al., "The Social Semantic Desktop", In Proceedings of Digital Enterprise Research Institute,Technical Report, May 2004, 7 pages.
Khare, et al., "Nutch: A Flexible and Scalable Open-Source Web Search Engine", In Proceedings of World Wide Web, May 10-14, 2005, 10 pages.

(Continued)

*Primary Examiner* — Hung T Vy
(74) *Attorney, Agent, or Firm* — Dave Ream; Jim Ross; Micky Minhas

(57) ABSTRACT

Methods for leveraging a user's social network connections to search files stored on client devices are provided. Upon receipt of a search query, it is determined that the searching user is a social network connection of at least one user of a social networking application having files on their client device designated for sharing. Those designated files are searched to determine if any of them match the received search query. Client device files associated with users of the social networking application that have been designated for public sharing also are searched. Any files shared publicly or with social network connections of the sharing user that are stored on a client device and determined to match the received query may be presented to the searching user independent of the algorithmic search results or may be integrated into the algorithmic search results, as desired.

20 Claims, 4 Drawing Sheets

(56) References Cited

OTHER PUBLICATIONS

Thomas, et al., "Metasearch Tools for Desktop Search", In Proceedings of SIGIR, Workshop on Desktop Search, Jul. 23, 2010, 2 pages.

Chirita, et al., "Summarizing Local Context to Personalize Global Web Search", In Proceedings of the 15th ACM International Conference on Information and Knowledge Management, Nov. 5-11, 2006, pp. 287-296.

Sauermann, et al., "Overview and Outlook on the Semantic Desktop", In Proceedings of the 1st Workshop on the Semantic Desktop workshop at the ISWC, Nov. 2005, 18 pages.

Geambasu, et al., "HomeViews: Peer-to-Peer Middleware for Personal Data Sharing Applications", In Proceedings of the ACM SIGMOD International Conference on Management of Data, Jun. 11-14, 2007, pp. 235-246.

* cited by examiner

IDENTIFYING FILES STORED ON CLIENT DEVICES AS WEB-BASED SEARCH RESULTS

BACKGROUND

The Internet is an invaluable tool for users to both search and share information. Typically, users perform searches through search engines to find answers to queries, and users also share information online through social network connections. However, searching and sharing through social network connections usually occur, if at all, distinctly from each other, not leveraging the benefits of integrating functionality available in both.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present invention relates to systems, methods, and computer-readable storage media for, among other things, searching files stored on client devices that are designated for sharing, either publicly or with social network connections of the sharing user. Upon receipt of a search query, it is determined whether the searching user is a social network connection of any users of a social networking application having files on their respective client devices designated for sharing. If it is determined that the searching user has one or more social network connections that have client-device files designated for sharing, those designated files are searched to determine if any of them match the received search query. Client device files associated with users of the social networking application that have been designated for public sharing also are searched. Generally, searching of client-device files is done in addition to determining algorithmic search results. Any files shared publicly or with social network connections of the sharing user that are stored on a client device and determined to match the received query may be presented to the searching user independent of the algorithmic search results or may be integrated into the algorithmic search results, as desired. Thus, the searching and sharing functionality described herein provides an additional source for Web content and an improved way for sharing information by expanding the content that is searchable by a search engine to include shared client device files.

BRIEF DESCRIPTION OF THE DRAWINGS

The present invention is illustrated by way of example and not limitation in the accompanying figures in which like reference numerals indicate similar elements and in which.

DETAILED DESCRIPTION

Figure 1:
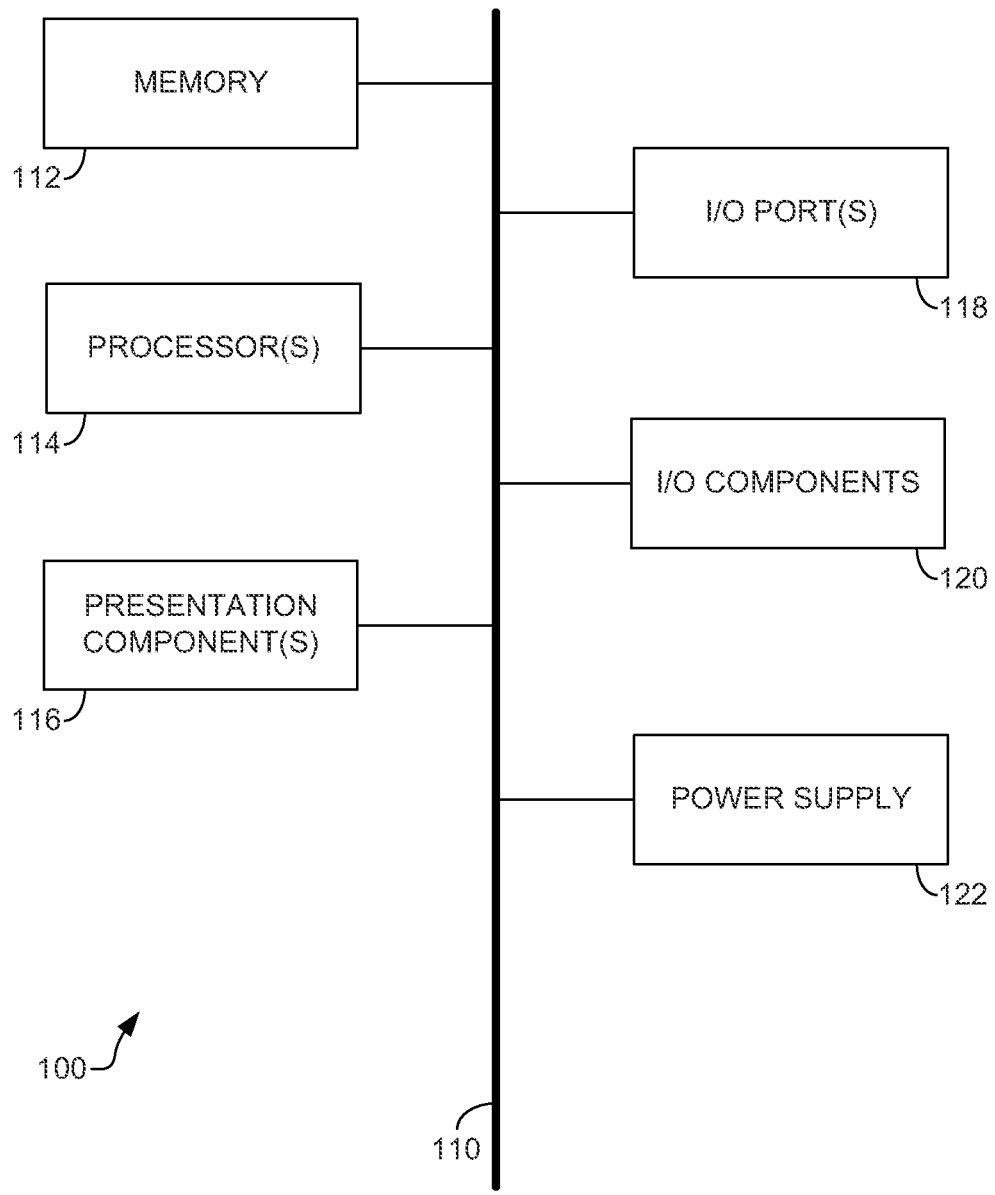
FIG. 1 is a block diagram of an exemplary computing environment suitable for use in implementing various aspects of the present invention.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for, among other things, searching files stored on client devices that are designated for sharing, either publicly or with social network connections of the sharing user. Upon receipt of a search query, it is determined whether the searching user is a social network connection of any users of a social networking application having files on their respective client devices designated for sharing. If it is determined that the searching user has one or more social network connections that have client-device files designated for sharing, those designated files are searched to determine if any of them match the received search query. Client device files associated with users of the social networking application that have been designated for public sharing also are searched. Generally, searching of client-device files is done in addition to determining algorithmic search results. Any files shared publicly or with social network connections of the sharing user that are stored on a client device and determined to match the received query may be presented to the searching user independent of the algorithmic search results or may be integrated into the algorithmic search results, as desired. Thus, the searching and sharing functionality described herein provides an additional source for Web content and an improved way for sharing information by expanding the content that is searchable by a search engine to include shared client device files.

Accordingly, computer-readable storage media storing computer-usable instructions that, when used by one or more computing devices, cause the one or more computing devices to perform a method for identifying, as search results, files stored on client devices that are designated for sharing are described. The method includes receiving a search query from a searching user and determining that the searching user is a social network connection of at least one sharing user, the social network connection being designated via a social networking application. The at least one sharing user has designated one or more files for sharing with his or her social network connections and the one or more files are stored on a client device associated with the sharing user. The method further includes identifying at least one of the one or more files as matching the received search query.

A system for identifying, as search results, files stored on client devices that are designated for sharing is also described. The system includes a computing device associated with a file service having one or more processors and one or more computer-readable storage media and a data store coupled with the file service, the data store being external to the client device. The file service receives a search query from a searching user and determines that the searching user is a social network connection of at least one sharing user, the social network connection being designated via a social networking application. The at least one sharing user has designated one or more files for sharing with his or her social network connections. The one or more files are stored concurrently on a client device associated with the sharing user and in association with the data store in such a way that changes made to the one or more files at the client device are stored in association with both the client device and the external data store. The file service additional determines that one or more client device files associated with users of the social networking application are designated for public sharing. The file service further identifies at least one file of the one or more files and/or the one or more client device files as matching the received search query.

Also described is a method for rendering files stored on a client device associated with a sharing user searchable to at least a portion of users of a social networking application. The method includes receiving selection of at least one file stored on the client device associated with the sharing user, receiving a user indication to associate the at least one file stored on the client device with at least one social network connection of the sharing user, and uploading the at least one file to a data store external to the client device and accessible by the social networking application.

Having briefly described an overview of various aspects described herein, an exemplary operating environment for implementation is described below in order to provide a general context for the various aspects. Referring to the figures in general and initially to FIG. 1 in particular, an exemplary operating environment is shown and designated generally as computing device 100. The computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Various aspects of the invention may be described in the general context of computer code or machine-useable instructions, including computer-useable or computer-executable instructions such as program modules, being executed by a computer or other machine, such as a personal data assistant or other handheld device. Generally, program modules including routines, programs, objects, components, data structures, and the like, refer to code that performs particular tasks or implements particular abstract data types. The invention may be practiced in a variety of system configurations, including hand-held devices, consumer electronics, general purpose computers, more specialty computing devices, etc. The invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventor hereof recognizes that such is the nature of the art, and reiterates that the diagram of FIG. 1 is merely illustrative of an exemplary computing device that can be used in connection with various aspects of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media that can be accessed by the computing device 100 and includes both volatile and nonvolatile media, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Combinations of any of the above are also included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors 114 that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices. Furthermore, although the term "server" is often used herein, it will be recognized that this term may also encompass a search engine, a set of one or more processes distributed on one or more computers, one or more stand-alone storage devices, a set of one or more other computing or storage devices, a combination of one or more of the above, and the like.

As previously set forth, described herein are systems, methods, and computer-readable storage media for, among other things, searching files stored on client devices that are designated for sharing, either publicly or with social network connections of the sharing user. Upon receipt of a search query, it is determined whether the searching user is a social network connection of any users of a social networking application having files on their respective client devices designated for sharing. If it is determined that the searching user has one or more social network connections that have client-device files designated for sharing, those designated files are searched to determine if any of them match the received search query. Client device files associated with users of the social networking application that have been designated for public sharing also are searched. Generally, searching of client-device files is done in addition to determining algorithmic search results. Any files shared publicly or with social network connections of the sharing user that are stored on a client device and determined to match the received query may be presented to the searching user independent of the algorithmic search results or may be integrated into the algorithmic search results, as desired.

Figure 2:
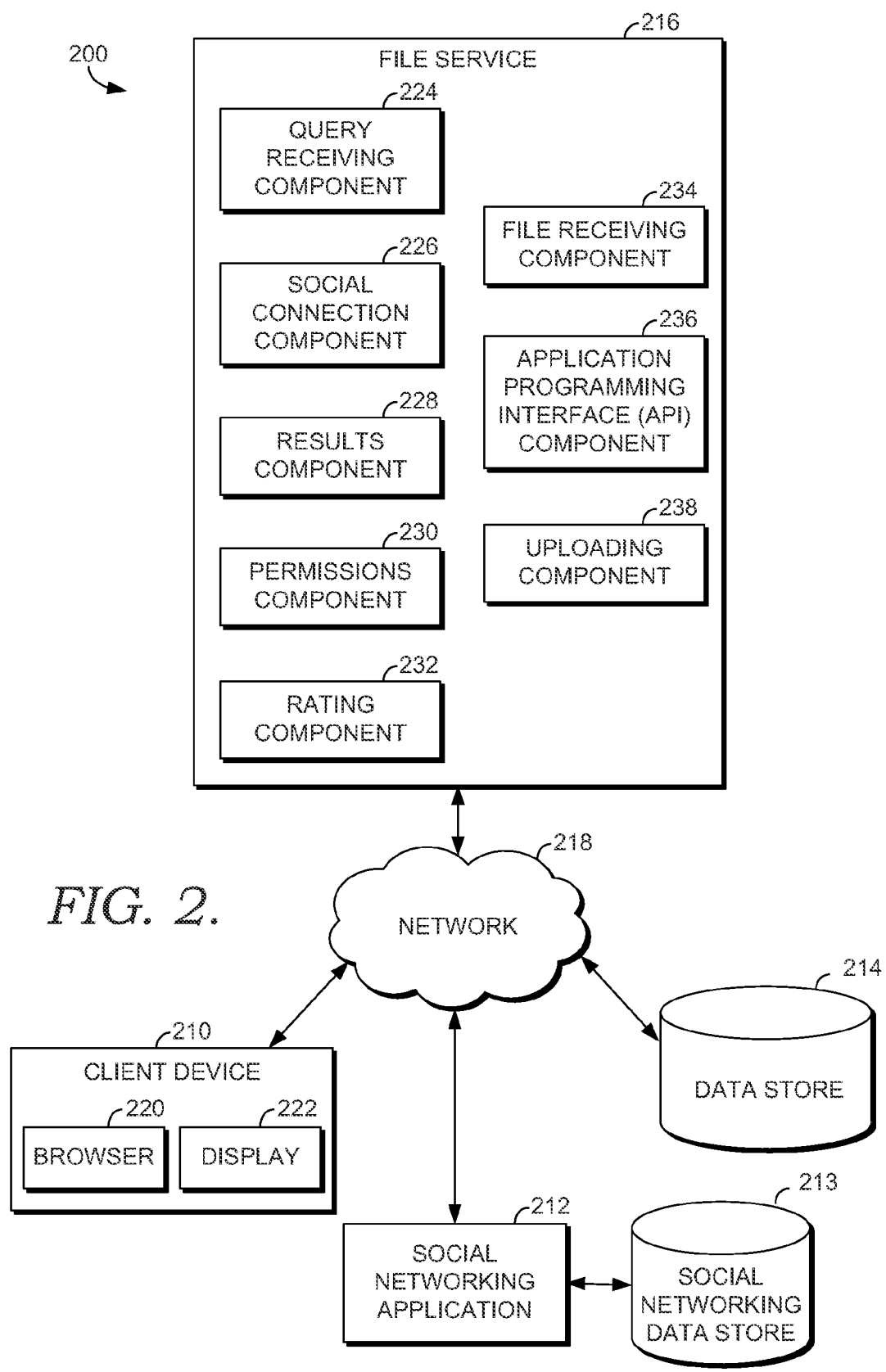
FIG. 2 is a block diagram of an exemplary computing system in which various aspects of the invention may be employed.

Turning now to FIG. 2, an exemplary computing environment 200 is depicted for use in searching and sharing files stored on client devices based on social network connections. The computing system environment 200 is merely an example of one suitable computing system environment and is not intended to suggest any limitation as to the scope of use or functionality of various aspects of the present invention. Neither should the computing system environment 200 be interpreted as having any dependency or requirement related to any single module/component or combination of modules/components illustrated therein.

The computing system environment 200 generally includes a client computing device 210, a social networking application 212, a data store 214, and a file service 216 all in communication with one another via a network 218. The network 218 may include, without limitation, one or more local area networks (LANs) and/or wide area networks (WANs). Such networking environments are commonplace in offices, enterprise-wide computer networks, intranets and the Internet. Accordingly, the network 216 is not further described herein.

One or more of the illustrated components/modules may be implemented as stand-alone applications. One or more of the illustrated components/modules may be integrated directly into, for example, the operating system of the client computing device 210 or the file service 216. The components/modules illustrated in FIG. 2 are exemplary in nature and in number and should not be construed as limiting. Any number of components/modules may be employed to achieve the desired functionality within the scope hereof. Further, components/modules may be located on any number of servers. By way of example only, the file service 216 might reside on a server, cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

The client computing device 210 may include any type of computing device, such as the computing device 100 described with reference to FIG. 1, for example. By way of example only and not limitation, the client computing device 210 may be a personal computer, desktop computer, laptop computer, handheld device, mobile handset, consumer electronic device, or the like. It should be noted, however, that the systems and method described herein are not limited to implementation on such computing devices, but may be implemented on any of a variety of different types of computing devices within the scope hereof.

A user may be associated with a client computing device 210 as a searching user or sharing user. A sharing user is a user that uses the client computing device 210 in any way to share files stored in association therewith other users based upon social network connections. For instance, a user may be associated with a personal computer (PC) when the user uses the PC to share files stored on the desktop thereof with at least one other user based upon social network connections. A searching user, on the other hand, is a user that utilizes one client computing device to search files stored, at least in part, in association with another client computing device by inputting a search query, generally into a user interface presented on a screen associated with the requesting client device. A user (searching or sharing) may be associated with a plurality of client devices.

Generally, the client computing device 210 includes a browser 220 and a display 222. The browser 220, among other things, is configured to render search engine home pages, social networking applications, search results pages, and file upload interfaces in association with the display 222 of the client computing device 210. The browser 220 is further configured to receive user search queries and user selection of files to be uploaded to a data store. Generally the search query input and user file selections are received via one or more user interfaces presented on the display 222. The browser 220 is also configured to receive content for presentation on the display 222, for instance, from the file service 216. It should be noted that the functionality described herein as being performed by the browser 218 may be performed by any other application capable of rendering Web content. Any such variations, and any combination thereof, are contemplated to be within the scope hereof.

The social networking application 212 is configured to facilitate electronic social networking between its users. In this regard, the social networking application 212 is configured to receive information about a user and maintain such information, for instance, in a social networking data store 213 associated with the social networking application 212. This information may be received through the social networking application 212 from a user associated with the client device 210. The social networking application 212 may be further configured to receive search queries to search information in the social networking data store 213 and to receive, through an upload interface, a user selection of files to be uploaded to the social networking data store 213.

The social networking application 212 is configured to permit its users to establish social network connections with other application users. In this way, a user may be connected to another user by a first degree connection (e.g., a "friend") meaning that the two users are directly connected with one another. Or, a user may not be directly connected with another user but have a second degree connection (e.g., a "friend of a friend") or more remote connection with that user through his/her first degree connections. A user may also be connected to another user through a group of which both users are members (e.g., "Fans of FIFA 2012").

The data store 214 is configured to store information for use by one or both of the social networking application 212 and the file service 216. Such information may include, without limitation, client-device files of one or more sharing users that have been designated for sharing with social network connections of the respective sharing users, information about social network connections of users of the social networking application 212, and access permission designations (more fully described below). Files stored on the client device 210 may be concurrently stored in association with the data store 214. It will be understood and appreciated by those of ordinary skill in the art that the information stored in association with the client device 210 may be configurable in such a way that changes made to the files at the client device 210 are stored in association with both the client device 210 and the data store 214. The files stored in association with the data store 214 are automatically updated upon the sharing user logging into the client device 210 on which the files are stored. Pre-determined periodic file updates also may take place. Any such variations, and any combination thereof, are contemplated to be within the scope hereof.

As previously set forth, the data store 214 is configured to store information about social network connections of users of the social networking application 212. Such information may include, without limitation, social networking identifiers (e.g., the identity of one or more social networks to which a user belongs, the name of a user's profile page or pages, and a location of a social network's users), social network connections (for instance, member identifiers, groups to which the members respectively belong, and first degree connections of social networking application members, as well as those that are more distant or remote) and user sharing information (e.g., information about whether or not a user has one or more client-device files designated for sharing, types of client devices, and a list of client devices sharing files). It will be understood and appreciated by those of ordinary skill in the art that the information stored in association with the data store 214 may be configurable and may include any information relevant to social networking identifiers, social network connections, and user sharing information. The information stored in association with the data store 214 is configured to be searchable for one or more of the items stored in association therewith.

The content and volume of such information are not intended to limit the scope of the present invention in any way. Further, though illustrated as a single, independent component, the data store 214 may, in fact, be a plurality of storage devices, for instance a database cluster, portions of which may reside in association with the file service 216, the social networking application 212, the client computing device 210, another external computing device (not shown), and/or any combination thereof.

The computing system environment 200 is merely exemplary. While the file service 216 is illustrated as a single unit, it will be appreciated that the file service 216 is scalable. For example, the file service 216 may in actuality include a plurality of computing devices in communication with one another. Moreover, the data store 214, or portions thereof, may be included within, for instance, the file service 216 as a computer-storage medium. The single unit depictions are meant for clarity, not to limit the scope hereof.

The file service 216 is configured to receive and respond to search queries that it receives from components associated with client computing devices, for instance, the browser 220 associated with the client computing device 210. Those skilled in the art of the present invention will recognize that aspects of the present invention may be implemented with any number of searching engines or uploading tools. For example, an Internet search engine or a Web upload tool may utilize aspects of the present invention. These search engines and upload tools are well known in the art, and commercially available engines and tools share many similar processes not further described herein.

As shown, the file service 216 includes a query receiving component 224, a social connection component 226, a results component 228, a permissions component 230, a rating component 232, a file receiving component 234, an Application Programming Interface (API) component 236, and an uploading component 238.

The query receiving component 224 is configured to receive (for instance, via the network 218) a search query from a searching user for files that match an input search query. Typically, such a request is received via a browser associated with a client computing device, for instance, the browser 220 associated with the client computing device 210. The query receiving component 224 may receive the search query either from a social networking application 212 or from a search engine (not shown). The searching user may or may not be engaged in an active session. This is discussed in more detailed below.

Upon receiving a search query, the social connection component 226 is configured to determine if the searching user is a social network connection of at least one sharing user. Thus, the social connection component 226 is configured to identify, by querying the data store 214, sharing users that have designated one or more files stored in association with a client device for sharing with social network connections and to identify social network connections of the sharing users. If the searching user is connected with one or more sharing users through a social network connection, then files designated for sharing may be searched to determine if one or more match the input search query. By way of example, a particular sharing user may share a document stored on the desktop of a client device associated with the sharing user (e.g., "FIFA 12 Cheats and Tips.doc") with all the members of a social networking application to whom s/he is connected through a particular group designation (e.g., members of group "Fans of FIFA 2012"). If the searching user is a social network connection of the sharing user and the searching user is a member of the "Fans of FIFA 2012," then the file may be searched to determine if it matches the input search query. If, however, the searching user is either not a social network connection of the sharing user or is a social network connection of the sharing user but is not a member of the "Fans of FIFA 2012," the document may not be searched to determine if it matches the input search query.

The social connection component may be associated with a social network application (e.g. social network application 212) which may also include information on sharing users that have designated one or more files stored in association with a client device for sharing with social network connections and social network connections of the sharing users (e.g., in social networking data store 213). In such instances, rather than identifying information by querying the data store 214, such information may be garnered by querying the social networking data store 213 associated with the social networking application 212. Any such variations, and any combination thereof, are contemplated to be within the scope hereof.

The social connection component 226 is configured to determine searchable files stored on client devices whether or not the searching user is engaged in an active session with the social networking application 212. That is, a searching user may be engaged with the social networking application by having a browser window actively logged into the social networking application 212. A user may also be engaged with the social networking application even without having an active window if s/he has opted in a previous active session with the social networking application to stay logged into the service even upon closure of the browser. The user also may login to the social networking application using a social networking identifier associated with the user. Any of such variations, and any combination thereof, are contemplated to be within the scope hereof. Whichever way the user establishes engagement with the social networking application, being engaged permits the file service 216 to access information about the user's social network connections. The social connection component 226 is further configured to receive the user's social networking identification from the social networking application 212.

By way of example only, the exemplary social networking application FACEBOOK, INC. of Palo Alto, Calif. employs an "instant personalization" functionality that enables users of FACEBOOK, INC. to log onto third party websites (e.g., the file service 216) with their FACEBOOK identity and access their FACEBOOK identity information from the context of the third party website.

If the searching user is not engaged with the social networking application 212, the social connection component 226 may still be configured to search the data store 214 and determine sharing users having one or more files designated for sharing with everyone—irrespective of social network connection status. For instance, a sharing user may make one or more files stored in association with a client device searchable by everyone (e.g., a group "Public"). As a result the social network connection would be designated as "Public." Thus, the social connection component designates all files shared through a "Public" social network connection as searchable in response to an input search query.

The results component 228 is configured to identify one or more files stored on a client device that have been designated by a sharing user for sharing with his or her social network connections that match an input search query. In this regard, the input to the results component 228 is the search query received (e.g., by the query receiving component 224) and the output is a listing of client-device, shared documents (files) that are determined to match the query. Algorithms for identifying search results are known to those of ordinary skill the art and, accordingly, are not further described herein. The results component 228 further is configured to transmit the files (or descriptors of the files and/or links thereto) that match the input search query for presentation (e.g., on the display 222 associated with the client computing device 210). Such transmission may be conditioned upon the identified matching files passing through the permissions component 230, described below.

The permissions component 230 is configured to determine those matching documents/files that have been designated by a sharing user for sharing with his or her social network connections that the searching user has permission to access. Such determination may be based upon at least one access permission designation. For instance, a file "FIFA 12 Tips and Cheats.doc" may have the permission "read/execute" to give the searching user access to the file. Thus, the input to the permissions component 230 is the results from the results component 228 and the output is list of files with permissions that allow the searching user access to the files. Types of file permissions and the configuration of file permissions are known to those of ordinary skill in the art and, accordingly, are not further described herein.

The rating component 232 is a service that is configured to assign a rating to search results that, among other things, allows the results to be ordered in a particular fashion upon presentation (e.g., on the display 222 associated with the client computing device 210). Document ratings may be based on any number of factors including, without limitation, relevance to the search query, number of times the document has been viewed, user-provided ratings of the document, and the like.

In addition to receiving and responding to search queries, the file service 216 is configured to receive client-device files designated for sharing with social network connections of a sharing user. In this regard, the file receiving component 234 is configured to receive files associated with a client device (e.g., the client computing device 210) that the sharing user has selected for uploading to the data store 214 (that is, that the sharing user has designated for sharing with at least a portion of his or her social network connections). Typically, the user makes the selection via an upload interface rendered through a browser associated with a search engine home page (not shown) or the social networking application 212.

The API component 236 is configured to receive a user indication to associate at least one social network connection with files selected for uploading and received by the file receiving component 234, where the social network connection is associated with a social networking application. A social network connection is typically associated with a social networking application if the social network connection is available within the application to facilitate communication between users in the application. (e.g., the social network connection "friend" is associated with FACEBOOK).

The API component 236 may make a call to an API associated with the social networking data store and retrieves social networking information there from. Such social networking information may include, without limitation, the identity of a social networking application (e.g., FACEBOOK, TWITTER, LINKEDIN) and information associated with the social networking application, for instance, types of social network connections (e.g., friend, Fans of FIFA 2012, Public) and permissions (e.g. read/execute, full control). The retrieved information may be from a plurality of social networking applications. For instance, the user may select FACEBOOK as the social networking application with the connection "friend" to associate with a file, and then select, TWITTER, and members of group "Fans of FIFA 12" to associate with the same file.

The API component 236 is further configured receive a user indication to associate access permissions for files identified for sharing. For instance, the file "FIFA 12 Tips and Cheats.doc" may be associated with the social network connection "Fans of FIFA 2012," with the permission to read/execute and to be shared with social network connections designated via FACEBOOK. Note that any shared file may be associated with a plurality of social networking applications, social network connections, and access permissions.

The upload component 238 is configured to receive files associated with a social network connection and permissions (e.g. by the API component 236) and upload the files to the data store 214. Files uploaded to the data store 214 may be stored in association with the client device and concurrently stored in association with the data store 214 in such a way that any changes made to the files at the client device are stored in association with the file instance in the data store 214 as well. The uploading component 238 is further configured to gather and update user sharing information. Typically user client sharing information includes information about whether or not a user is sharing, types of client devices, and a list of client devices sharing files which are all updated in the social networking data stored based on new information. It will be understood and appreciated by those of ordinary skill in the art that the uploading component 238 can retrieve and upload user client information stored in association with the data store 214.

Figure 3:
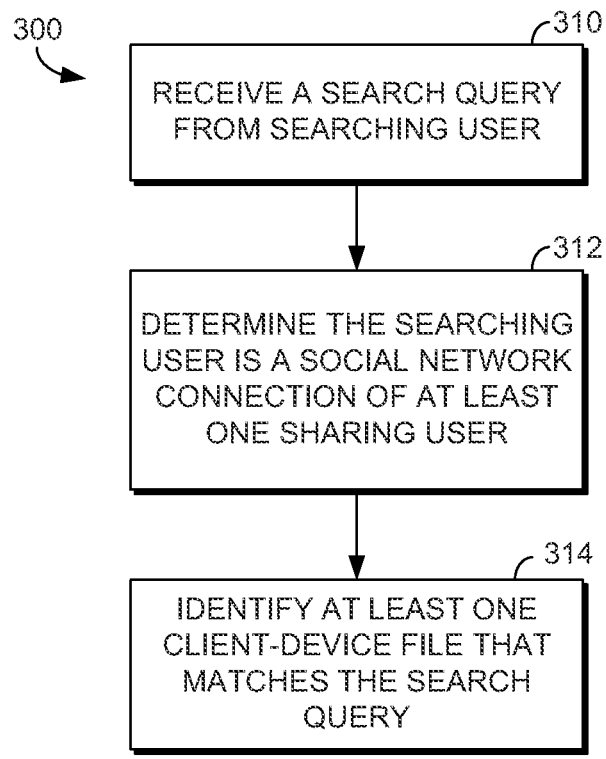
FIG. 3 is a flow diagram showing an exemplary method described herein for searching client device files based on a searching user's social network connections.

With reference now to FIG. 3, a flow diagram is illustrated showing an exemplary method 300 for identifying search results based on searching users' social network connections designated via a social networking application. As indicated at block 310, a search query is received from a searching user. This may be received, for example, by the query receiving component 224 via a search query input field of a search engine or a social networking application user interface associated with the file service 216 of FIG. 2. As indicated at block 312, it is determined that the searching user is a social network connection of at least one sharing user that has designated one or more client-device files for sharing with his or her social network connections. At block 314 at least one client-device file that has been designated for sharing by a social network connection of the searching user and that matches the received query is identified.

Figure 4:
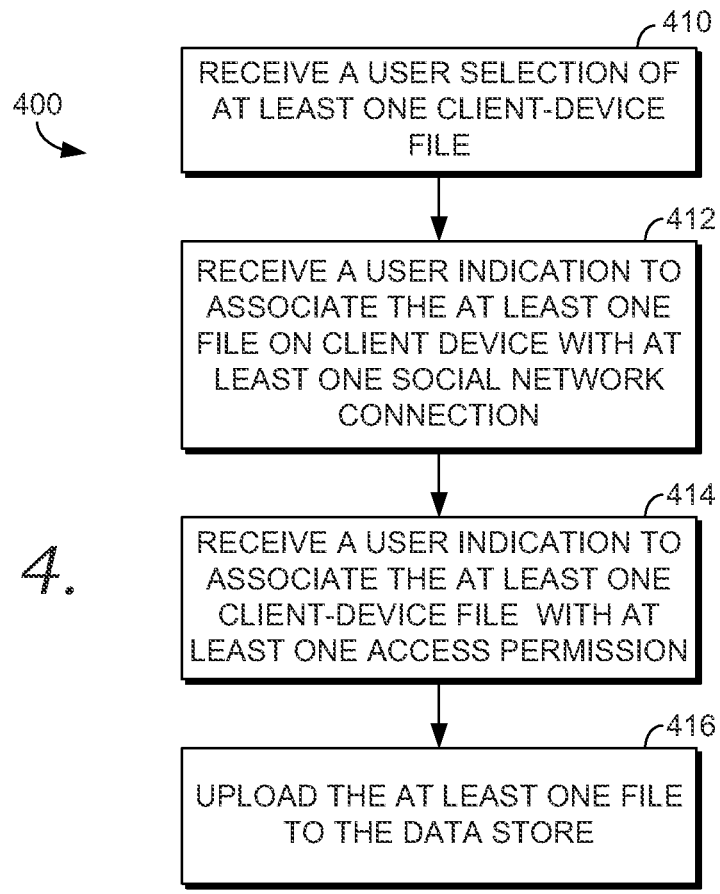
FIG. 4 is a flow diagram showing an exemplary method described herein for rendering files stored on a client device associated with a sharing user searchable based on the sharing user's social network connections.

With reference now to FIG. 4, a flow diagram is illustrated showing an exemplary method 400 for rendering files stored on a client device associated with a sharing user searchable to at least a portion of the sharing user's social network connections designated via a social networking application. As indicated at block 410, a user selection of at least one file stored on the client device associated with the sharing user is received. This may be received by, for example, by the file receiving component 234 of FIG. 2 via an upload interface rendered through a browser on either a search engine homepage or a social networking application associated with the file service 216 of FIG. 2.

As indicated in block 412 a user indication to associate the at least one file stored on the client device with at least one of the sharing user's social network connections is received (e.g., utilizing the API component 236). This may be done, for example, by having the API component call the social networking data store 213 of FIG. 2 to retrieve social networking information. For instance, the user indication may be a check mark signifying whether to allow or deny associating the at least one social network connection with the at least one file. As described herein above, a file may be associated with a plurality of social network connections and social networking applications. At block 414 at user indication to associate the at least one file with at least one access permission is received. In this regard, the API component 236 of FIG. 2 may receive the user indication, for instance, in the form of a check mark, signifying whether to allow or deny a particular sharing permission to social network connections of a sharing user. As indicated at block 416, the at least one file then is uploaded to a data store external to the client device and accessible by the social networking application (e.g., data store 214 of FIG. 2).

Figure 5:
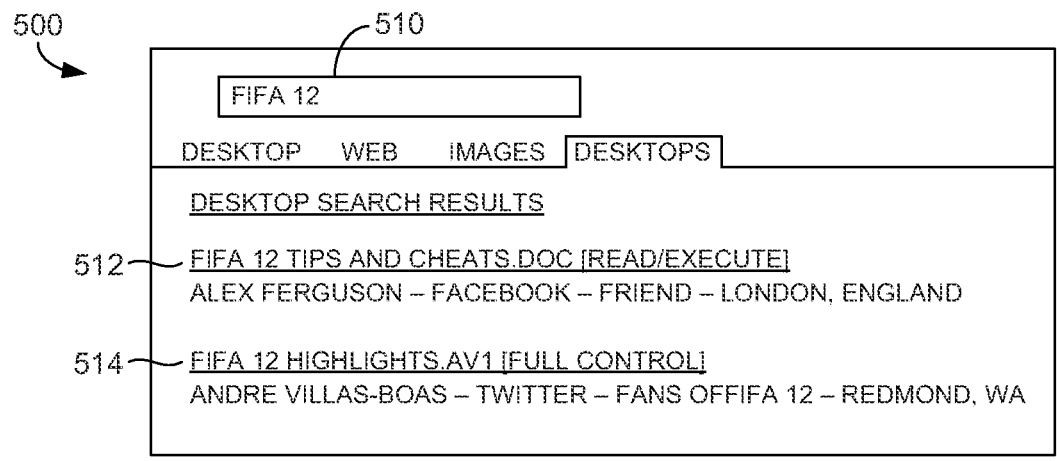
FIG. 5 is a schematic diagram showing an exemplary screen display illustrating a listing of desktop files identified as matching an input search query and searched based on a searching user's social network connections.

With reference to FIG. 5, a schematic diagram is illustrated showing an exemplary screen display 500 of a listing of search results determined in response to searching shared files stored on one or more client-device desktops. As illustrated, a searching user has input the search query "FIFA 12" into a search box 510 configured for receiving alpha-numeric textual input. Two files designated for sharing by a social network connection of the user and matching the searching user's query were identified. There is presented a designation that the first file 512 "FIFA 12 Tips and Cheats.doc" was shared by the searching user's social network connection Alex Ferguson. There is also an indication that the searching user and Alex Ferguson have a FACEBOOK first degree connection "friend" and the searching user has "read/execute" permissions. The second file 514 "FIFA 12 Highlights.avi" includes a designation that it was shared by a social network connection of the searching user, Andre Villas-Boas. There is also an indication that the searching user and Andre Villas-Boas have a TWITTER group connection "Fans of FIFA 12", and searching user has "full control" permissions.

It should be noted that although the screen display of FIG. 5 illustrates the client-device search results as being separated and presented to the user in a dedicated display, such results may also be integrated into algorithmically-derived search results (e.g., Web search results) determined as per known methodologies. The document/file source designations become increasingly useful in such scenarios.

Figure 6:
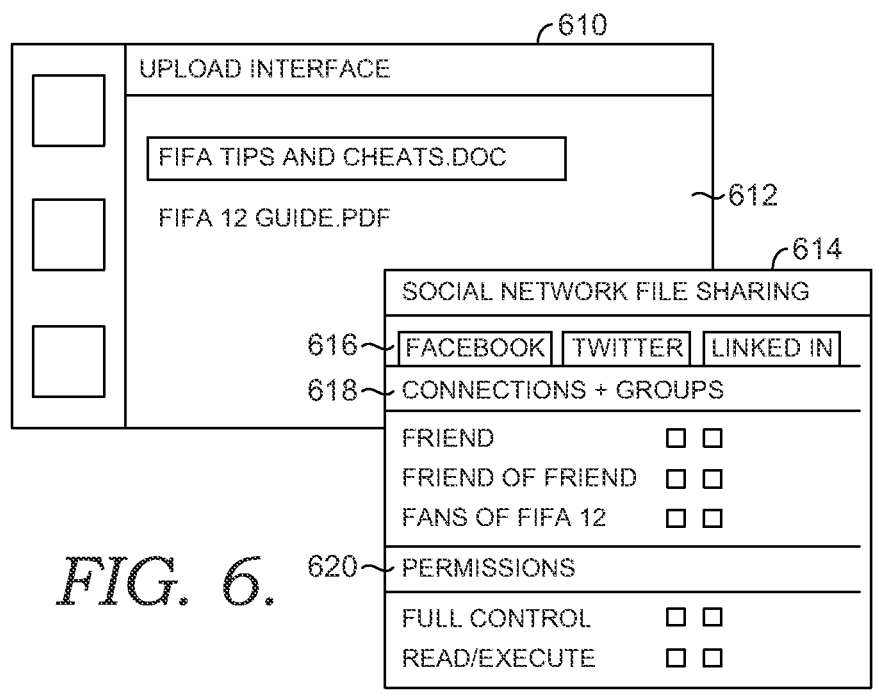
FIG. 6 is a schematic diagram showing an exemplary screen display illustrating an interface for making files stored in association with a client device searchable based on a sharing user's social network connections.

With reference to FIG. 6, a schematic diagram is illustrated showing an exemplary screen display 600 of searching desktop files based on a searching user's social network connections. In the illustrated example, in the upload interface 610 has been rendered through a browser and the user selected two files stored in association with the desktop "FIFA 12 Tips and Cheats.doc" and "FIFA 12 Guide.pdf" 612. The user has highlighted "FIFA 12 Tips and Cheats.doc" to associate with at least one social network connection and at least on access permission. The social networking file sharing window 614 present an interface with information from the social networking data store to receive the user indications to associate with the file.

The interface has a social networking applications section 616, a 'connections+groups' section 618 and a permissions section 620.

As can be understood, aspects of the present invention provide systems and methods for leveraging a user's social network connections to search and share files stored on client devices. The present invention has been described in relation to particular aspects, which are intended in all respects to be illustrative rather than restrictive. Alternative aspects will become apparent to those of ordinary skill in the art to which the present invention pertains without departing from its scope.

While the invention is susceptible to various modifications and alternative constructions, certain illustrated aspects thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the method 300 of FIG. 3 and the method 400 of FIG. 4 are not meant to limit the scope hereof in any way and, in fact, the steps may occur in a variety of different sequences. Any such variations, and any combination thereof, are contemplated to be within the scope of aspects of the present invention.

What is claimed is:

1. One or more computer-readable storage media storing computer-usable instructions that, when used by one or more computing devices, cause the one or more computing devices to perform a method for identifying, as search results, files stored on client devices that are designated for sharing, the method comprising:

receiving a search query from a searching user;

determining that the searching user is a social network connection of at least one sharing user, the social network connection being designated via a social networking application, wherein the at least one sharing user has designated one or more files for sharing with social network connections of the sharing user;

determining that the one or more files being are stored on a client device associated with the sharing user, wherein the one or more files stored on the client device are selectively designated as searchable for a selected social networking application from a plurality of social networking applications via an interface displaying the plurality of social networking applications selectable for designating the one or more files for sharing;

querying a social networking data store of the selected social networking application for information on the sharing user and designation information of the one or more files;

determining one or more designation information corresponding to the selected social networking application, the one or more files are selectively designated as searchable based on particular designation information corresponding to each of the plurality of social networking applications via an interface; and identifying at least one of the one or more files stored on the client device as matching the received search query, wherein the one or more files are communicated for display with information on the sharing user and the one or more designations.

2. The one or more computer-readable storage media of claim 1, wherein the one or more files that are designated for sharing are concurrently stored in association with a data store external to the sharing user's client device in such a way that changes made to the one or more files at the sharing user's client device are stored in association with both the sharing user's client device and the external data store.

3. The one or more computer-readable storage media of claim 1, wherein the method further comprises searching any client device files associated with users of the social networking application that have been designated for public sharing to determine if one or more of the publicly shared client device files match the received search query.

4. The one or more computer-readable storage media of claim 1, wherein, at a time the search query is received, the searching user is engaged an active session with the social networking application.

5. The one or more computer-readable storage media of claim 4, wherein receiving the search query from the searching user comprises receiving the search query via the social networking application or via search engine.

6. The one or more computer-readable storage media of claim 1, wherein identifying the one or more files includes identifying for display for each of the one or more files each of the following:
a corresponding social network application of the one or more files:
a corresponding connection of the one or more matching client device files;
a corresponding sharing user associated with the one or more client device files; and
a corresponding permission associated with the one or more client device files.

7. The one or more computer-readable storage media of claim 1, wherein determining that the searching user is a social network connection of the at least one sharing user comprises determining that the searching user is at least one of a first degree social network connection and a second degree social network connection of the at least one sharing user as designated via the social networking application.

8. The one or more computer-readable storage media of claim 1, further comprising:
determining that at least one access permission designation is associated with the at least one of the one or more files; and
determining, based upon the at least one access permission designation, that the searching user is authorized to access the at least one of the one or more files.

9. The one or more computer-readable storage media of claim 8, further comprising presenting a descriptor of the at least one of the one or more files such that a presentation placement among a plurality of other presented file descriptors is based, at least in part, upon the rating assigned to the at least one of the one or more files.

10. The one or more computer-readable storage media of claim 1, further comprising assigning a rating to the at least one of the one or more files.

11. A system for identifying, as search results, files stored on client devices that are designated for sharing, the system comprising:
a client device associated with a file service, the client device having one or more processors and one or more computer-readable storage media; and
a data store coupled with the file service, the data store being external to the client device, wherein the file service is configured for:
receiving a search query from a searching user;
determining that the searching user is a social network connection of at least one sharing user, the social network connection being designated via a social networking application, wherein the at least one sharing user has designated one or more files for sharing with social network connections of the sharing user;
determining that the one or more files are stored on the client device associated with the sharing user, wherein the one or more files stored on the client device are selectively designated as searchable for a selected social networking application from a plurality of social networking applications via an interface displaying a plurality of social networking applications selectable for designating the one or more files for sharing, wherein the one or more files are selectively designated as searchable based on particular designation information corresponding to each of the plurality of social networking applications;
upon determining that the searching user is the social network connection of at least one sharing user, determining that one or more files associated with users of the social networking application are designated for public sharing; and
searching the one or more files and one or more web files to determine files as matching the received search query, wherein matching files include one or more matching client device files that are provided for display in a separate dedicated display from one or more matching web files based on being located on the client device.

12. The system of claim 11, wherein, upon the search query being received by the file service, the searching user is engaged in an active session with the social networking application.

13. The system of claim 12, wherein the one or more matching client device files are displayed while concurrently indicating each of the following:
a corresponding social network application of the one or more matching client device files;
a corresponding connection of the one or more matching client device files;

a corresponding sharing user associated with the one or more client device files; and a corresponding permission associated with the one or more client device files.

14. The system of claim 11, wherein the file service receives the search query via a search engine or the file service receives the search query via the social networking application.

15. The system of claim 11, wherein the file service determines that the searching user is a social network connection of the at least one sharing user by determining that the searching user is at least one of a first degree social network connection and a second degree social network connection of the at least one sharing user.

16. The system of claim 11, wherein the file service further:
determines that at least one access permission designation is associated with the at least one of the one or more files; and determines, based upon the at least one access permission designation, that the searching user is authorized to access the at least one of the one or more files.

17. The system of claim 11, wherein the file service further:
assigns a rating to the at least one file; and presents a descriptor of the at least one file such that a presentation placement among a plurality of other presented file descriptors is based, at least in part, upon the rating.

18. One or more computer-readable storage media storing computer-usable instructions that, when used by one or more computing devices, cause the one or more computing devices to perform a method for identifying, as search results, files stored on client devices that are designated for sharing, the method comprising:

receiving a search query from a searching user, wherein the search query is received via a social networking application search interface, the searching user is engaged an active session with the social networking application;

determining that the searching user is a social network connection of at least one sharing user, the social network connection being designated via a social networking application, wherein the at least one sharing user has designated one or more files for sharing with social network connections of the sharing user;

determining that the one or more files are being stored on a client device associated with the sharing user, wherein the one or more files stored on the client device are selectively designated as searchable via an interface displaying a plurality of social networking applications selectable for designating the one or more files for sharing;

querying a social networking data store of the selected social networking application for information on the sharing user and designations of the one or more files; and identifying at least one of the one or more files as matching the received search query, wherein the one or more files are communicated for display with information of the sharing user and the one or more designations within, the active session with the social networking application, in a separate dedicated display from one or more matching web files, based on being located on the client device.

19. The method of claim 18, wherein the interface further comprises an upload interface for selecting one or files and a corresponding one or more social network applications for designating the one or more files as searchable on the corresponding one or more social network applications.

20. The method of claim 18, wherein the at least one selectable connections option and the at least one selectable permissions option correspond with a selected social networking application.

* * * * *